SURFACE MODIFIED ALUMINA HYDRATE FILLER

Freeman M. Sanderford, Dalton, Ga., and Jack C. Ray, Baton Rouge, La., assignors to Kaiser Aluminum & Chemical Corporation, Oakland, Calif.
No Drawing. Filed June 4, 1971, Ser. No. 150,217
Int. Cl. C09k 3/28; C09d 5/18
U.S. Cl. 252—8.1    15 Claims

ABSTRACT OF THE DISCLOSURE

Surface modified alumina hydrate compositions are provided which are compatible with latex compositions when utilized as flame-retardant fillers. The surface modification is accomplished by treating alumina hydrate with a small but effective quantity of a surfactant comprising a mixture of ethoxylated fatty acid amides with an amino alcohol. The surface modifier alumina hydrate, even in significant quantities, is particularly suitable as filler for latex foam compositions.

BACKGROUND OF THE INVENTION

This invention relates to alumina hydrates used as filler for latex compositions. More specifically, it concerns surface modification of alumina hydrates to render the hydrates compatible with latex compositions.

Inorganic materials, such as alumina hydrates, glassfiber and gypsum, are frequently employed as fillers for latex compositions. These fillers can impart increased mechanical strength and, in many instances, increased flame-retardancy to latex compositions, which are often utilized in the manufacture of cushioning materials, such as foam seats, carpet-backings, etc. For the manufacture of these cushioning materials, the latex compositions are generally foamed and it is considered important to obtain a foam which does not shrink during processing. Inorganic fillers incorporated in the foamable latex have the tendency to cause shrinkage, with occasional complete collapse of the foams, can cause swelling of the foam, and also the fillers in many instances tend to agglomerate and segregate from the latex compositions, resulting in a nonuniform, poor quality product. The agglomeration and/or segregation of the filler from the latex, and particularly shrinkage of the foam, becomes more pronounced when a considerable quantity of filler is to be incorporated in the latex composition. Filler quantities in excess of 20 parts by weight per 100 parts of latex pose serious processing problems, and poor quality products result unless the filler is made compatible with the latex compositions. Recently, it became of major importance to improve the flame-retardancy of latex-filler compositions and to achieve this purpose, increased quantities of fillers possessing flame-retardant properties were needed to be incorporated in the latex compositions. Increased quantities of inorganic fillers aggravate the segregation and agglomeration problem, particularly in the case of foamed products. Substantially increased quantities of filler, preferred for flame-retardancy and employed often in excess of 50 parts by weight per 100 parts of latex composition, causes such a high degree of shrinkage that the foamed latex will be unacceptable for its intended use.

Alumina hydrates are known to possess flame-retardant properties resulting from the considerable quantity of water of hydration associated with the alumina and thus constitutes a preferred filler material for latex compositions. However, in many instances the surface characteristics of the alumina hydrates render them unsuitable for incorporation in latex compositions, particularly in larger quantities. It has already been suggested, for example in U.S. Pat. 2,809,173, to modify the surface of inorganic fillers, such as glass fibers, with a surfactant to render them compatible with latex compositions. The process described in the above-referenced U.S. patent involves the slurrying of the inroganic filler in water with a cationic surfactant. This processing step not only involves a costly operation, such as slurrying, but also necessitates the inclusion of an anionic surfactant in the latex composition in quantities sufficient to balance the effect of any excess cationic surfactant on the surface of the glass fibers. The requirement to add an anionic surfactant to the latex composition for balancing the properties of the filler in many instances would require reformulation of the latex composition and, in addition, the quantity of anionic surfactant to be added to the latex must be closely controlled to avoid the generation of undesirable changes in the quality of the latex product from batch to batch.

It has now been discovered that the surface of alumina hydrate filler can be modified in a manner which allows its use in significant quantities without causing appreciable shrinkage when employed as filler for foams. Also, the novel surface modification eliminates the requirement of adjusting the latex composition to balance the effect of the surfactant applied to the filler. The present invention enables ready incorporation in the latex of the modified alumina hydrate filler with substantially uniform results from batch-to-batch.

BRIEF SUMMARY OF THE INVENTION

A surface-modified alumina hydrate compatible with latex compositions is provided. Alumina hydrate containing from about 15 to about 45% by weight of water is treated with a small but effective quantity of surfactant composition. The surfactant composition is a mixture of an ethoxylated fatty acid amide of the general structure

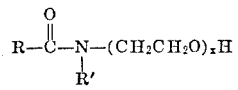

and of an amino alcohol of the general formula

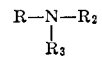

In the ethoxylated fatty acid amide, R is an alkyl radical of 7–21 carbon atoms, R' is hydrogen or an alkyl radical having 1 to 4 carbon atoms, or a $(CH_2CH_2O)_yH$ radical where $y$ can be 1 to 20; $x$ is an integer from 1 to 20. The $R_1$, $R_2$ and $R_3$ radicals of the amino alcohol can be hydrogen and alkylols selected from the group consisting of ethylol, propylol, isopropylol-, butyl- and isobutylol-radicals provided that at least one of $R_1$, $R_2$ and $R_3$ is an alkylol radical. The quantity of surfactant composition applied to the alumina hydrate is from about 0.1 to about 2.5% by weight of the hydrate.

DETAILED DESCRIPTION OF THE INVENTION

This invention relates to surface-modified alumina hydrates employed as filler for latex compositions.

For the purposes of this invention, the expression "alumina hydrate" refers to $Al_2O_3 \cdot xH_2O$ wherein $x$ varies from 1 to 3; in other words, the water content of the alumina hydrate varies between 15 and 45% by weight of the alumina, determined by calcination of the alumina hydrate at 1000° F. for one hour. The alumina hydrate, which is modified according to the invention, can be obtained from many sources, most commonly as the product of the well-known Bayer process.

The expression "latex composition" as used herein refers to compositions which are aqueous dispersions or emulsions of natural or synthetic elastomers or mixtures of these, and also additives generally employed in the preparation of latex products. These additives may be stabilizers, curing agents, antioxidants, sensitizing agents and others well known in the art.

The term "ethoxylated fatty acid amide" refers to compounds of the general formula

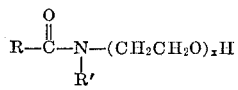

where R equals an alkyl, a saturated or unsaturated chain having 7 to 21 carbon atoms in a straight or branched chain: R' equals hydrogen or an alkyl radical of 1 to 4 carbon atoms or a $(CH_2CH_2O)_yH$ group where $y$ is an integer of 1 to 20; $x$ is an integer from 1 to 20. Advantageously, the sum of $x$ and $y$, or the total number of ethoxyl units is from 2 to 20.

Representative examples include the ethoxylated amides of capric, lauric, myristic, oleic, palmitic, linoleic and stearic acids and mixtures thereof. Particularly good results can be achieved by employing the ethoxylated amide of coconut fatty acid, which is known to be a mixture of lauric, myristic, palmitic, stearic, oleic, linoleic, capric and caprylic acids. While the degree of ethoxylation of the fatty acid amide can be varied within the limits provided above, it is preferred to employ ethoxylated fatty acids which are water-soluble. These ethoxylated fatty acid amides are readily available in commerce.

The amino alcohol to be utilized in admixture with the ethoxylated fatty acid amide possesses the general formula of

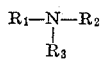

where $R_1$, $R_2$ and $R_3$ are selected from the group consisting of hydrogen, ethylol-, propylol-, isopropylol-, butylol-, isobutylol- radicals; provided, however, when any of $R_1$, $R_2$ or $R_3$ is hydrogen, at least one of the other R substituents must be an alkylol radical. Examples of amino alcohols falling within the scope of the above definition include mono-, di-, and triethanolamine, mono-, di-, tri-, propanol and isopropanol amino, mono-, di-, tri-, butanol and isobutanolamine.

The surfactant utilized to surface-modify the alumina hydrate comprises a mixture of the ethoxylated fatty acid amide with the amino alcohol. In the mixture, the amide to amino alcohol weight ratio is controlled within the ratios of about 16:1 and 8:4, to establish a pH value for the mixture between about 8.5 and 12. Preferably, the amide to amino alcohol weight ratio in the mitxure is between about 8:1 and 8:3 and the pH is between about 9 and 11.5.

The surfactant mixture of the present invention, hereinafter referred to as "surfactant," is generally liquid at room temperature and thus can be applied directly to the alumina hydrate. If desired, the surfactant can be employed in an aqueous dispersion or solution to the alumina hydrate. Other solvents or dispersing agents, for example organic inert solvents, can also be applied for carrying the surfactant composition to the surface of the hydrate. Such inert solvents include those which have a low boiling point, generally below 100° C., and which after the treatment of the hydrate with the surfactant will evaporate without contamination of the hydrate.

Generally, the quantity of surfactant required for the modification of the alumina hydrate surface is small. It was observed that even about 0.1% surfactant (percentage calculated on the basis of the weight of alumina hydrate) is effective in reducing the shrinkage of foams made from latex-alumina hydrate mixtures. Excellent results in latex foam shrinkage reduction were observed when surfactant quantities between about 0.5 and 2.5% were utilized. Surfactant quantities in excess of about 3.5% by weight of alumina hydrate can cause swelling of latex-alumina hydrate foams and thus can impart undesirable physical properties to the foams.

Surprisingly, it has been discovered that in order to obtain the best results, the alumina hydrate should be of small praticle size prior to admixture with the latex composition. The small particle size of the alumina hydrate is believed to enhance the surface modifying effect of the surfactant, and it has been found that when the alumina hydrate is ground to a particle size wherein at least about 50% by weight of the hydrate passes through a screen having openings of 0.044 mm., the surfactant effect can be optimized. Particularly good results were achieved when the alumina hydrate possessed a particle size wherein at least about 70% by weight of the hydrate passed through a screen having openings of 0.044 mm.

Incorporation of the surfactant in the alumina hydrate can be accomplished by several means, provided however that substantially uniform distribution of the surfactant on the hydrate is achieved. For example, the surfactant can be sprayed on the alumina hydrate prior to grinding or during grinding, wherein the grinding operation will assist in the distribution of the surfactant throughout the hydrate. If desired, the surfactant can be applied, after grinding, by spraying the ground alumina hydrate. In this case it is advisable to provide some movement to the hydrate to ensure fairly uniform distribution of the surfactant.

While the surface modified alumina hydrate of the present invention is particularly suitable for being employed as filler for latex compositions to be foamed, the surface modified alumina can equally successfully be employed for other nonfoamable latex compositions, where the filler is to impart improved physical properties, such as increased flame-retardancy. The surface modified alumina hydrate, whether utilized as filler in foamable or nonfoamable latex compositions, allows substantially uniform distribution of the alumina hydrate throughout the latex composition without encountering segregation and/or agglomeration problems so often imparted by other fillers. An additional advantage of the novel alumina hydrate-surfactant compositions is that there is no need to adjust the usual latex compositions by the addition of other surfactants to balance the effect of the surface modified alumina hydrate.

It was also found that the novel alumina hydrate-surfactant compositions can be utilized as fillers in much greater quantities than prior art fillers. Thus, it has been discovered that even about 50–200 parts by weight of surface modified alumina quantities per 100 parts by weight of latex composition (calculated on the dry weight of the latex composition) can be utilized without encountering any decrease in the physical properties of the latex products. In case of latex foams, even with the increased filler quantity, an appreciable decrease in foam shrinkage can be observed in addition to the significantly increased physical strength imparted by the filler.

The following example and tables are presented for further illustration of the effects of the novel alumina hydrate-surfactant compositions when used as fillers for latex compositions.

EXAMPLE

An alumina hydrate, the composition of which is shown in Table I, was used for all comparative tests described in this example. The alumina hydrate was ground and the surfactants were added during grinding to assure substantially uniform distribution throughout the alumina hydrate.

For all the comparative tests a latex composition containing natural rubber latex 40 parts by weight, synthetic latex 60 parts by weight, potassium oleate 2.75 parts by weight, amine sensitizer 1 part by weight, hexametaphosphate 0.25 part by weight (all calculated on dry weight basis) and a small quantity of ammonium hydroxide was used. For curing a zinc oxide, sulfur and zinc diethyl dithiocarbamate composition was employed and as gelling agent, ammonium acetate was utilized. For the preparation of foamed test samples, the latex composition was thoroughly admixed with the alumina hydrate, frothed by incorporation of air, then aged and from the aged froth a slab of 1.2 cm. thickness was prepared. The slab was cured at 170° C. for 23 minutes and then the thickness of the slab was checked and compared to the original thickness. The reduction in thickness was calculated in percentage and expressed as percent shrinkage.

The results of the comparison tests are shown below:

TABLE I.—COMPOSITION OF ALUMINA HYDRATE

| Constituent: | Percent by weight |
|---|---|
| $SiO_2$ | 0.007 |
| $Fe_2O_3$ | 0.009 |
| $CaO$ | 0.08 |
| $Na_2O$ | 0.45 |
| Acid insoluble | 0.03 |
| Water content [1] | 34.70 |
| $Al_2O_3$ (by difference) | 64.80 |

[1] Determined by calcination of the alumina hydrate for one hour at 1000° C.

TABLE II
[Effect of surface modification on the shrinkage of latex-foam slabs]

| | Filler | Surfactant | Shrinkage percent |
|---|---|---|---|
| 1 | Alumina hydrate. | None | 14.6 |
| 2(a) | do | Ethoxylated coconut fatty acid amide. | 8.4 |
| 2(b) | do | Ethoxylated coconut fatty acid amide plus diethanol amine (amide:amine weight ratio=8:1) pH 9-10. | 1.4 |
| 2(c) | do | Ethoxylated coconut fatty acid amide plus triethanol amine (amide:amine weight ratio=10:1) pH 9-10. | 2.8 |
| 3(a) | do | Stearyl acid amide | 14.2 |
| 3(b) | do | Ethoxylated stearic acid amide plus diethanol amine (amide:amine weight ratio=10:1). | 3.7 |

Note.—In all instances, the surfactant was added to the alumina hydrate in an amount of 0.5% by weight of the hydrate.

TABLE III

Effect of surfactant concentration on shrinkage (Surfactant: ethoxylated coconut fatty acid amide and diethanol amine; amide:amine weight ratio 8:1)

| Surfactant concentration (weight percent of alumina hydrate): | Shrinkage percent |
|---|---|
| None | 14.50 |
| 0.25 | 7.50 |
| 0.50 | 3.33 |
| 0.75 | 1.67 |
| 1.00 | 0.56 |
| 3.5 | Swelling |

TABLE IV
[Effect of filler load on shrinkage]

| Filler load (parts by weight per 100 parts by dry wt. latex composition) | Shrinkage, percent | |
|---|---|---|
| | Surfactant modified hydrate | Unmodified hydrate |
| 50 | 1-2 | 10-15 |
| 100 | 1-3 | 10-20 |
| 150 | 1-4 | 10-20 |
| 200 | 1-4 | 10-20 |

What is claimed is:

1. A surface modified alumina hydrate compatible with latex compositions which comprises an alumina hydrate in admixture with a surfactant composition, wherein the alumina hydrate contains from about 15 to about 45% by weight water as determined by calcination at 100° C. for one hour; and wherein the surfactant composition is a mixture of an ethoxylated fatty acid amide and an amino alcohol, the ethoxylated fatty acid amide having the general formula of

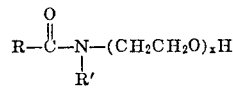

where R is an alkyl radical of 7 to 21 carbon atoms, R' is selected from the group consisting of hydrogen, alkyl radicals having one to four carbon atoms and $(CH_2CH_2O)_yH$ where y is an integer from 1 to 20; and x is an integer from 1 to 20, the total number of ethoxyl radicals attached to the fatty acid amide is at least 2; the amino alcohol having the general formula of

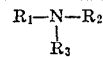

where $R_1$, $R_2$ and $R_3$ are selected from hydrogen and the group of alkylol radicals consisting of ethylol-, propylol-, isopropylol-, butylol-, and isobutylol-, and wherein at least one of $R_1$, $R_2$ and $R_3$ is one of said alkylol radical; said surfactant mixture having a fatty acid amide to amino alcohol weight ratio between about 16:1 and 8:4; and wherein said surface modified alumina hydrate contains from about 0.1 to about 2.5% by weight of surfactant composition.

2. The surface modified alumina hydrate of claim 1 wherein the ethoxylated fatty acid amide is coconut fatty acid amide.

3. The surface modified alumina hydrate of claim 1, wherein the amino alcohol is diethanol amine.

4. The surface modified alumina hydrate of claim 1, wherein the ethoxylated fatty acid amide is coconut fatty acid amide and the amino alcohol is diethanol amine.

5. The surface modified alumina hydrate of claim 1, wherein at least about 70% by weight of the hydrate passes through a screen having openings of 0.044 mm.

6. The surface modified alumina hydrate of claim 1, wherein the ethoxylated fatty acid amide and amino alcohol weight ratio is between about 8:1 to 8:3.

7. A surface modified alumina hydrate compatible with latex compositions which comprises an alumina hydrate in admixture with a surfactant composition, wherein the alumina hydrate contains from about 15 to about 45% by weight water, as determined by calcination at 1000° C. for one hour, said hydrate possesses a particle size wherein at least about 70% by weight of the hydrate passes through a screen having openings of 0.044 mm.; and wherein the surfactant composition is a mixture of an ethoxylated coconut fatty amide and diethanol amine and the number of ethoxyl units attached to said amide is from 2 to 20; the surfactant mixture having an amide to amine weight ratio is from about 8:1 to about 8:3, and wherein the surface modified hydrate contains from about 0.1 to about 2.5% by weight of surfactant mixture.

8. A process for modifying the surface of alumina hydrate to render it compatible with latex compositions, which comprises: admixing alumina hydrate having a water content from about 15 to about 45% by weight, as determined by calcination at 1000° C. for one hour, with a surfactant composition, said surfactant composition comprising an ethoxylated fatty acid amide and an amino alcohol; the ethoxylated fatty acid amide having the general formula of

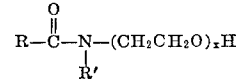

where R is an alkyl radical of 7 to 21 carbon atoms, R' is selected from the group consisting of hydrogen, alkyl radicals having one to four carbon atoms and $(CH_2CH_2O)_yH$ where $y$ is an integer from 1 to 20; and $x$ is an integer from 1 to 20, the total number of ethoxyl radicals attached to the fatty acid amide is at least 2; the amino alcohol having the general formula of

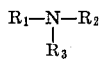

where $R_1$, $R_2$ and $R_3$ are selected from hydrogen and the group of alkylol radicals consisting of ethylol-, propylol-, isopropylol-, butylol-, and isobutylol-, and wherein at least one of $R_1$, $R_2$ and $R_3$ is one of said alkylol radical; said surfactant mixture having a fatty acid amide to amino alcohol weight ratio between about 16:1 and 8:4; the admixture containing from about 0.1 to about 2.5% by weight surfactant composition; and comminuting the admixture to obtain particle size reduction of the hydrate, so that at least about 70% of the hydrate is of a particle size passing through a screen having openings of 0.044 mm.; and substantially uniform distribution of the surfactant composition throughout the hydrate.

9. Process according to claim 8, wherein the admixing and comminuting is accomplished simultaneously.

10. Process according to claim 8, wherein the alumina hydrate is comminuted prior to the admixture of the hydrate with the surfactant composition.

11. Process according to claim 8 with the additional step of incorporating the alumina hydrate-surfactant composition into a latex composition.

12. Process according to claim 8, wherein the ethoxylated fatty acid amide is an ethoxylated coconut fatty acid amide.

13. Process according to claim 8, wherein the amino alcohol is diethanol amine.

14. Process according to claim 8, wherein the amide is an ethoxylated coconut fatty acid amide and the amino alcohol is diethanol amine.

15. Process according to claim 1, wherein the amide to amino alcohol weight ratio is between about 8:3 and 8:1.

References Cited

UNITED STATES PATENTS

| | | | |
|---|---|---|---|
| 2,809,173 | 10/1957 | Dereniuk | 260—2.5 |
| 3,006,868 | 10/1961 | Stamberger et al. | 260—2.5 |
| 3,262,894 | 7/1966 | Green | 260—2.5 |
| 3,560,253 | 2/1971 | Ashton | 252—8.1 X |
| 3,486,850 | 12/1969 | Day | 23—-143 |
| 3,545,923 | 12/1970 | Mercier et al. | 23—143 |

OTHER REFERENCES

Schwartz, A. M. et al.: Surface Active Agents and Detergents, vol. II, Interscience Publishers Inc. (1958), pp. 125–134.

CHARLES E. VAN HORN, Primary Examiner

U.S. Cl. X.R.

106—15 FP, 308; 260—2.5 FP, 2.5 L, 29.7 R; 117—137; 23—143

UNITED STATES PATENT OFFICE
CERTIFICATE OF CORRECTION

Patent No. 3,699,041           Dated October 17, 1972

Inventor(s) Freeman M. Sanderford and Jack C. Ray

It is certified that error appears in the above-identified patent and that said Letters Patent are hereby corrected as shown below:

Column 2, Line 6, "inroganic" should be -- inorganic --

Column 2, Line 66, "1000°F." should be -- 1000°C. --

Column 2, Line 52, "butyl" should be -- butylol --

Column 3, Line 44, "amino" should be -- amine --

Column 5, Line 74, "100°C." should be -- 1000°C. --

Signed and sealed this 13th day of March 1973.

(SEAL)
Attest:

EDWARD M. FLETCHER, JR.　　　　　　　ROBERT GOTTSCHALK
Attesting Officer　　　　　　　　　　Commissioner of Patents